(12) United States Patent
Dishneau (10) Patent No.: US 8,983,501 B2
(45) Date of Patent: Mar. 17, 2015

(54) PROXIMITY-BASED TASK NOTIFICATION (75) Inventor: Darin J. Dishneau, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/105,754

(22) Filed: May 11, 2011

(65) Prior Publication Data
US 2012/0289254 A1    Nov. 15, 2012

(51) Int. Cl.
*H04W 24/00*    (2009.01)
*H04W 4/02*    (2009.01)

(52) U.S. Cl.
CPC ..................................... *H04W 4/023* (2013.01)
USPC ...................... 455/456.3; 455/414.2; 455/410; 455/566; 705/14.16; 705/14.25; 705/39

(58) Field of Classification Search
CPC .............................................. H04M 2203/2072
See application file for complete search history.

(56) References Cited

U.S. PATENT DOCUMENTS

| | | | |
|---|---|---|---|
| 5,983,200 A | 11/1999 | Slotznick | |
| 6,177,905 B1 | 1/2001 | Welch | |
| 6,823,188 B1 | 11/2004 | Stern | |
| 7,068,189 B2 | 6/2006 | Brescia | |
| 7,394,405 B2 | 7/2008 | Godden | |
| 7,653,594 B2 | 1/2010 | Davis | |
| 7,940,172 B2 | 5/2011 | Bell et al. | |
| 8,538,807 B2 | 9/2013 | Dishneau et al. | |
| 2001/0037259 A1 | 11/2001 | Sharma et al. | |
| 2002/0102993 A1 | 8/2002 | Hendrey et al. | |
| 2003/0191578 A1* | 10/2003 | Paulauskas et al. | 701/200 |
| 2004/0093274 A1 | 5/2004 | Vanska et al. | |
| 2004/0230685 A1* | 11/2004 | Seligmann | 709/228 |
| 2005/0221806 A1* | 10/2005 | Sengupta et al. | 455/414.3 |
| 2005/0273493 A1 | 12/2005 | Buford et al. | |
| 2006/0273930 A1 | 12/2006 | Godden | |
| 2006/0288347 A1* | 12/2006 | Jemiolo et al. | 718/102 |
| 2007/0061205 A1 | 3/2007 | Crolley | |
| 2007/0143499 A1 | 6/2007 | Chang | |
| 2007/0188319 A1 | 8/2007 | Upton | |
| 2008/0032703 A1 | 2/2008 | Krumm et al. | |
| 2008/0082396 A1 | 4/2008 | O'Connor et al. | |
| 2008/0154727 A1 | 6/2008 | Carlson | |
| 2008/0195312 A1* | 8/2008 | Aaron et al. | 701/209 |
| 2008/0214166 A1 | 9/2008 | Ramer et al. | |
| 2008/0281510 A1* | 11/2008 | Shahine | 701/207 |

(Continued)

OTHER PUBLICATIONS

Sohn, et al., "Place-Its: A Study of Location-Based Reminders on Mobile Phones", Retrieved at << http://www.kevinli.net/placeits-ubicomp05.pdf>>, UbiComp, 2005, p. 232-250.

(Continued)

*Primary Examiner* — Rafael Pérez-Guitiérrez
*Assistant Examiner* — Keith Fang
(74) *Attorney, Agent, or Firm* — Bryan Webster; Kate Drakos; Micky Minhas (57) ABSTRACT

This document describes proximity-based task notification. By notifying a user of an entity at which the user can perform a task when that entity is near to the user, the techniques enable the user to decide, at a time and location likely convenient to the user, whether or not to perform the task now at the entity or wait until a later occasion. If the user wishes to forgo performing the task, the techniques can notify the user again when the entity or some other entity is likely to be convenient to the user.

20 Claims, 8 Drawing Sheets

(56) References Cited

U.S. PATENT DOCUMENTS

| | | | |
|---|---|---|---|
| 2009/0259547 A1 | 10/2009 | Clopp | |
| 2009/0313089 A1 | 12/2009 | Bonner et al. | |
| 2010/0093371 A1 | 4/2010 | Gehrke et al. | |
| 2010/0217525 A1* | 8/2010 | King et al. | 701/300 |
| 2010/0280880 A1 | 11/2010 | Faith et al. | |
| 2011/0010737 A1 | 1/2011 | Bouazizi et al. | |
| 2011/0045801 A1 | 2/2011 | Parker | |
| 2011/0060636 A1 | 3/2011 | Grossman et al. | |
| 2011/0093324 A1 | 4/2011 | Fordyce, III et al. | |
| 2011/0112992 A1* | 5/2011 | Liu et al. | 706/11 |
| 2011/0144908 A1* | 6/2011 | Cheong | 701/209 |
| 2011/0164861 A1* | 7/2011 | Kunkel et al. | 386/343 |
| 2011/0320307 A1 | 12/2011 | Mehta et al. | |
| 2012/0130796 A1 | 5/2012 | Busch | |
| 2013/0018714 A1 | 1/2013 | George | |
| 2013/0060627 A1 | 3/2013 | Harrison | |
| 2013/0097002 A1 | 4/2013 | Dishneau | |
| 2014/0012668 A1 | 1/2014 | Dishneau | |

OTHER PUBLICATIONS

"GeoQpons Introduces Time-Based Alerts for Mobile Shopping and Savings", *Live-PR Public Relations & News*, retrieved from <http://www.live-pr.com/en/geoqpons-introduces-time-based-alerts-for-r1048824624.htm>,(Jan. 4, 2011), 2 pages.

"Placecast and Location Labs Team up for Location-Based Shopping Alerts", VentureBeat.com, retrieved from <http://venturebeat.com/2010/08/18/placecast-and-location-labs-team-up-to-deliver-location-based-shopping-alerts-via-text-message/> on May 11, 2011, (Aug. 18, 2010), 6 pages.

Acquisti, Alessandro et al., "Conditioning Prices on Purchase History", *Carnegie Mellon University, University of California, Berkeley*, Available at <http://citeseerx.ist.psu.edu/viewdoc/download?doi=10.1.1.58.3641&rep=rep1&type=pdf>, (Aug. 2001), pp. 1-36.

"Non-Final Office Action", U.S. Appl. No. 13/224,242, (Jan. 31, 2013), 12 pages.

"Non-Final Office Action", U.S. Appl. No. 13/276,227, (Dec. 14, 2012), 20 Pages.

"Shopping by Phone Takes Off", *Web Japan, Japan Echo Inc., Tokyo*, Retrieved from:<http://web-japan.org/trends/lifestyle/lif060725.html> on Dec. 3, 2012, (Jul. 25, 2006), 2 pages.

"Notice of Allowance", U.S. Appl. No. 13/276,227, (May 15, 2013), 7 pages.

"Final Office Action", U.S. Appl. No. 13/224,242, (Aug. 15, 2013), 20 pages.

"Non-Final Office Action", U.S. Appl. No. 13/224,242, Jul. 31, 2014, 18 pages.

"Non-Final Office Action", U.S. Appl. No. 14/018,032, Oct. 23, 2014, 20 pages.

"What Personal Information Should You Give to Merchants?", Fact Sheet 15, Privacy Rights Clearinghouse, retrieved from <https://www.privacyrights.org/what-personal-information-should-you-give-merchants> on Oct. 23, 2014, Jul. 1994, 14 pages.

Edelman, "Sears Exposes Customer Purchase History in Violation of Its Privacy Policy", Retrieved from <http://www.benedelman.org/news/010408-1.html> on Oct. 23, 2014, Jan. 4, 2008, 3 pages.

* cited by examiner

PROXIMITY-BASED TASK NOTIFICATION

BACKGROUND

Currently, when a user wants to be reminded to perform a task, the user can enter some description of the task into a computing device, such as in an electronic calendar. Assume, for example, that a user wants to be reminded to pick up shampoo after work. The user can enter "buy shampoo" into his electronic calendar for when he expects to leave work, in this example 5:00 pm. The electronic calendar then chimes, pings, or otherwise reminds the user of this appointment in the calendar, usually 15 minutes before the appointment, and often repeating the text as entered: "buy shampoo." Electronic calendars, however, often fail to adequately remind users. The user may leave early from work and thus not receive the reminder until he is already home. Or the user may receive the reminder while at work but end up staying late and then forget the task by the time he leaves.

SUMMARY

This document describes techniques and apparatuses for proximity-based task notification. In some embodiments, the techniques receive a task entered by a user, determine entities at which the user may perform the task, and notify the user when the user is near one of those entities. Thus, a user may enter a task of "Buy Strawberries and Bananas" and receive a notification when he is within two miles of a grocery store, a fruit stand, or a farmer's market.

This summary is provided to introduce simplified concepts for proximity-based task notification, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for proximity-based task notification are described with reference to the following drawings. The same numbers are used throughout the drawings to reference like features and components.

DETAILED DESCRIPTION

Overview

This document describes proximity-based task notification. By notifying a user of an entity at which the user can perform a task when that entity is near to the user, the techniques enable the user to decide, at a time and location likely convenient to the user, whether or not to perform the task now at the entity or wait until a later occasion. If the user wishes to forgo performing the task, the techniques can notify the user again when the entity or some other entity is likely to be convenient to the user.

The task can be as simple as "go to grocery store" and the notification simply indicate when the user is near the user's favorite grocery store. The task and the notification can also be robust or complex. Consider a case where a user wishes to buy a gift for his wife for their wedding anniversary. Assume that the user enters, on May $1^{st}$, the following text into a device: "ski stuff for anniversary" and a deadline for the task of May $15^{th}$. Assume that the techniques determine that the following entities are likely to be those at which the user can perform the task: Bill's Ski Chalet, Down-Town Adventure Travel, and Surf and Ski, Inc.

On May $1^{st}$, the user drives, on his way home from work, within three miles of Bill's Ski Chalet, seven miles of Down-Town Adventure Travel, and one-half mile of Surf and Ski, Inc. Based on the task still having fourteen more days to complete, the techniques notify the user of Surf and Ski, Inc. but not the other stores. Assume that the user decides not to visit Surf and Ski, Inc. and instead goes home. This may be due to the user procrastinating, being too busy, or knowing that Surf and Ski, Inc. will not have something his wife will like. In any case, however, assume that the user, on the way to work three days later, passes within three miles of Bill's Ski Chalet and also one-half mile from Surf and Ski, Inc. The techniques, because the user either out-right indicated no interest in Surf and Ski, Inc. or because the task now has only 10 days to be performed, notifies the user that Bill's Ski Chalet is three miles away. Notice that in both cases the user has not needed to remember the task, move the task in a calendar, or perform other potentially time-consuming operations. The techniques simply remind the user when appropriate entities are proximate the user.

Assume further that the user has decided that the best gift is a ski trip, rather than new skis, and so does not visit Bill's Ski Chalet either. As the deadline gets closer, however, the techniques notify the user of entities further away, in this case Down-Town Adventure Travel, which is seven miles from the user on his typical drive to or from work. The user then visits Down-Town Adventure Travel to buy a weekend trip to a local ski resort, thereby completing the task. This is but one example of how techniques for proximity-based task notification can determine appropriate entities and proximities at which to notify a user. This document now turns to an example environment in which the techniques can be embodied, after which various example methods for performing the techniques are described.

Example Environment

Figure 1:
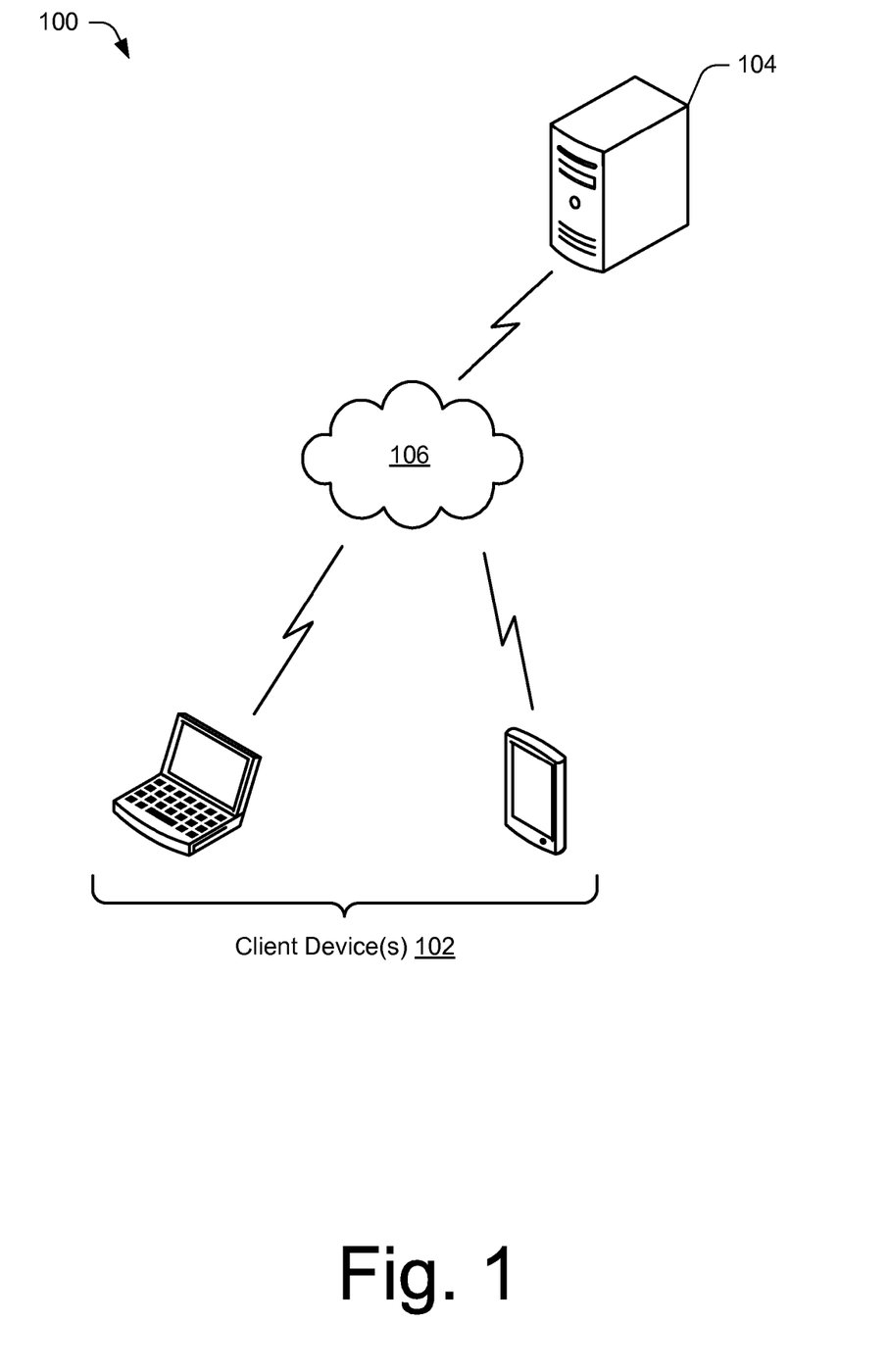
FIG. 1 illustrates an example environment in which techniques for proximity-based task notification can be implemented.

FIG. 1 is an illustration of an example environment 100 in which the techniques may provide proximity-based task notifications. Environment 100 includes one or more mobile computing device(s) 102, a remote device 104, and a communication network 106. Mobile computing device 102 provides notifications to a user and may determine, or be used to determine, the user's location. Mobile computing device 102 may also perform other operations either alone or in conjunction with other device(s), such as remote device 104. Mobile computing devices 102 and remote device 104 interact through communication network 106, which may be the Internet, a local-area network, a wide-area network, a wireless network, a USB hub, a computer bus, another mobile communications network, or a combination of these.

Figure 2:
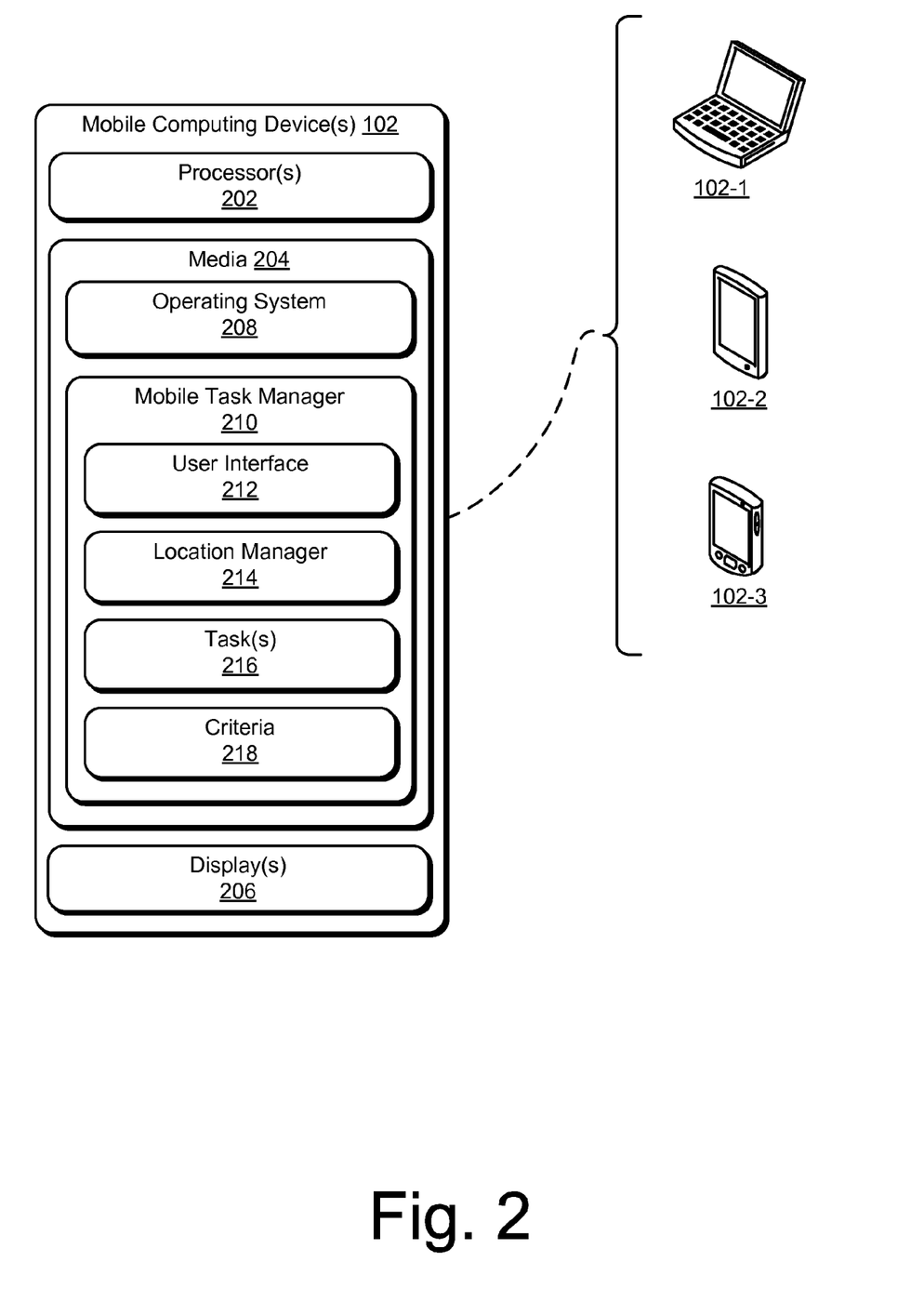
FIG. 2 is a more-detailed illustration of mobile computing devices illustrated in FIG. 1.

FIG. 2 is an illustration of an example embodiment of mobile computing device 102. Mobile computing device 102 includes one or more processors 202, computer-readable storage media ("media") 204, and display(s) 206. Media 204 includes an operating system 208 and mobile task manager 210. Mobile task manager 210 includes or has access to one or more of a user interface 212, a location manager 214, one or more task(s) 216, and criteria 218.

Mobile task manager 210 manages proximity-based task notifications either alone or in combination with other entities described herein. User interface 212, shown included in mobile task manager 210, notifies a user, such as with an audio or visual indicator, email, text message, or etc. Location manager 214 aids in determining the geographic location of mobile device 102. Tasks 216 include one or more tasks received by, or associated with, a user and that can be performed with or at an entity having a location. Criteria 218 include various information, history, priorities, or factors used by the techniques to determine an appropriate proximity threshold. Proximities and proximity thresholds are described in greater detail below.

As shown in FIG. 2, mobile computing device(s) 102 can each be one or a combination of various computing devices, here illustrated with three examples: a laptop computer 102-1, a tablet computer 102-2, and a smart phone 102-3, though other computing devices and systems, such as netbooks and cellular phones, may also be used.

Figure 3:
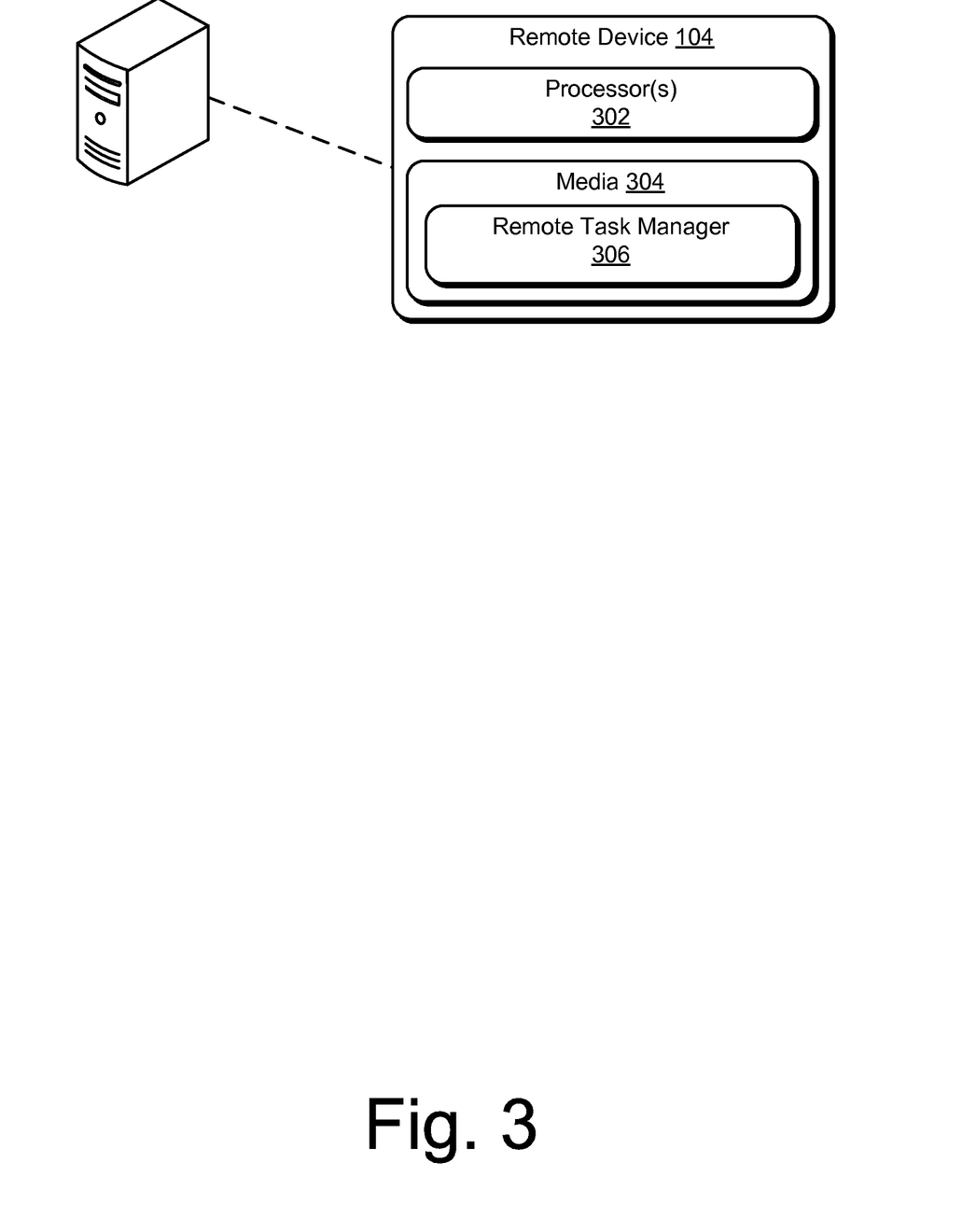
FIG. 3 is a more-detailed illustration of the remote device of FIG. 1.

FIG. 3 is an illustration of an example embodiment of remote device 104. Remote device 104 includes one or more remote processors 302 and remote computer-readable storage media ("remote media") 304. Media 304 includes or has access to a remote task manager 306. Remote task manager 306 manages proximity-based task notifications either alone or in combination with other entities described herein. Remote task manager 306 may include or have access to entities similar or identical to location manager 214, task(s) 216, and criteria 218. Like mobile task manager 210, remote task manager 306 may cause mobile device 102 to notify a user through user interface 212. For example, remote task manager 306 may send a text, email, or markup-language document to mobile device 102 in response to which mobile device 102 notifies the user through user interface 212, such as through presenting the text message or email, or rendering the markup-language document as hyper-text machine language, to name just a few examples.

These and other capabilities, as well as ways in which entities of FIGS. 1-3 act and interact, are set forth in greater detail below. Note also that these entities may be further divided, combined, and so on. Thus, the environment 100 of FIG. 1 and the detailed illustrations of FIGS. 2 and 3 illustrate some of many possible environments capable of employing the described techniques.

Example Methods

Figure 4:
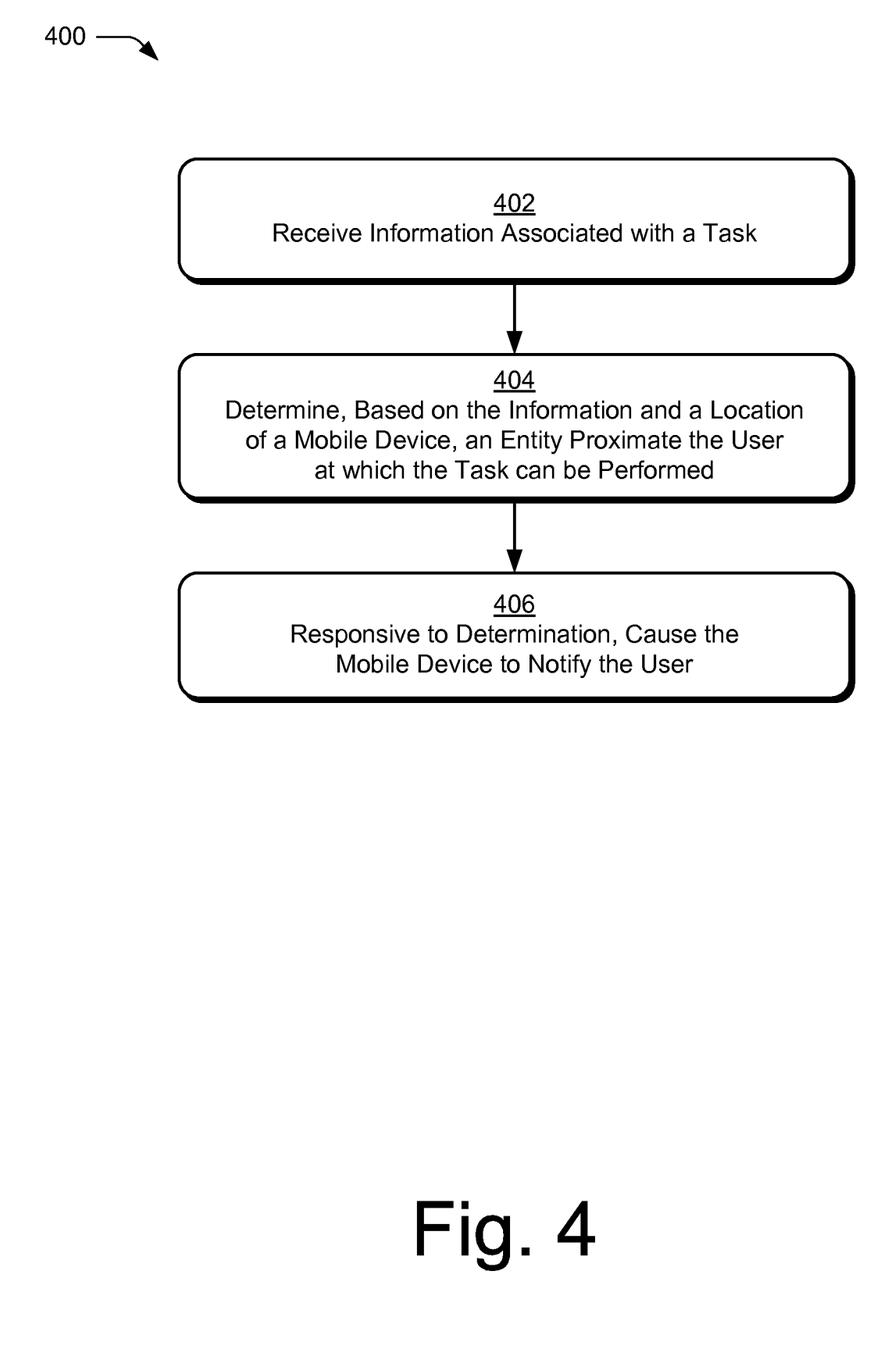
FIG. 4 illustrates an example method for proximity-based task notification from the perspective of one or more entities operating at the mobile device and/or the remote device of FIGS. 1, 2, and 3.
Figure 6:
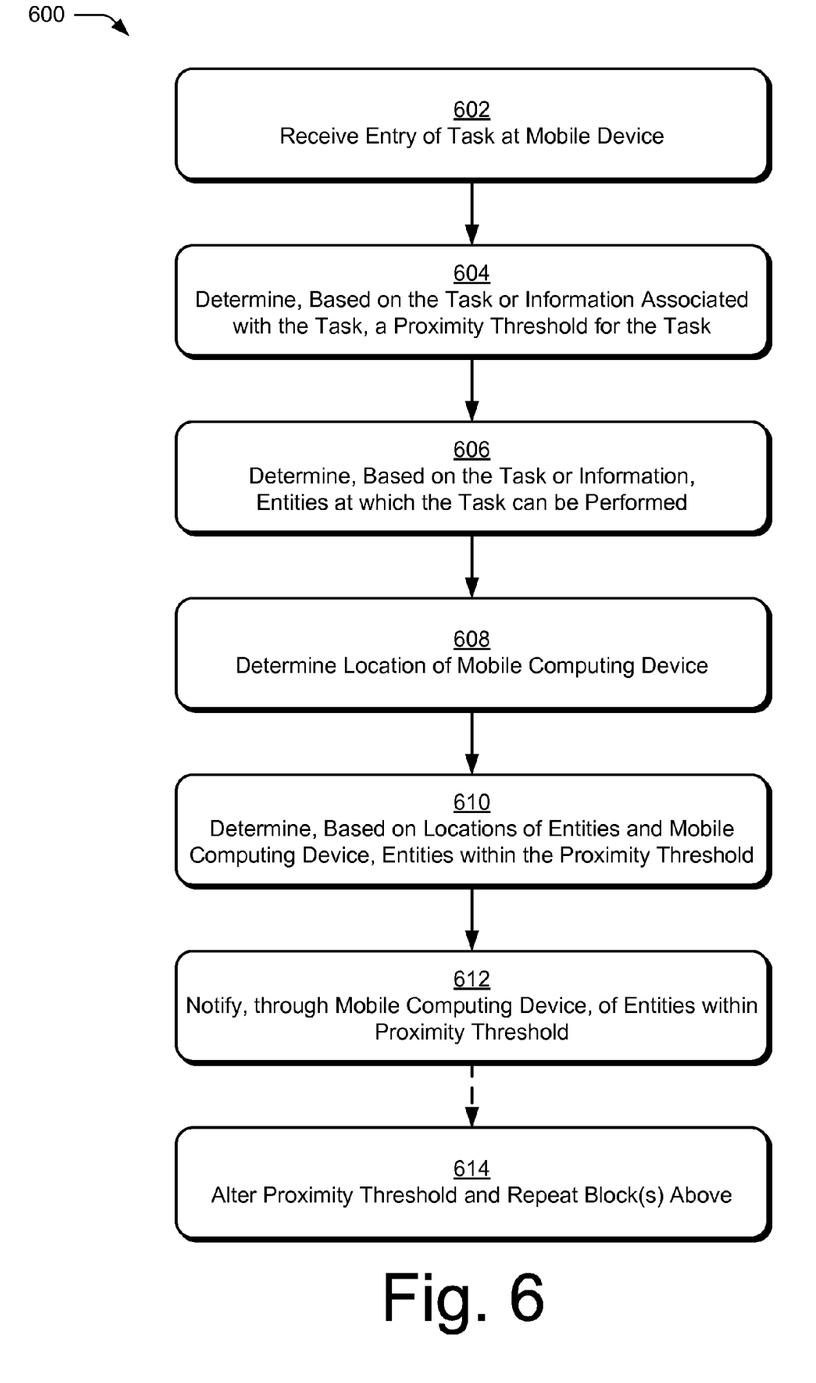
FIG. 6 illustrates an example method for proximity-based task notification from the perspective of the mobile task manager of FIG. 2.

FIGS. 4 and 6 depict example methods for proximity-based task notification. FIG. 4 depicts a method from the perspective of one or more entities operating at mobile device 102 and/or remote device 104. FIG. 6 depicts a method from the perspective of an entity operating on mobile device 102. The techniques are not limited to performance by one entity or multiple entities operating on one device. These methods are shown as sets of blocks that specify operations performed but are not necessarily limited to the order shown for performing the operations by the respective blocks. In portions of the following discussion reference may be made to environment 100 of FIG. 1 and as detailed in FIGS. 2-3, reference to which is made for example only.

Block 402 receives information associated with a task. As noted above, this task is often specified by a user, and often is intended for later performance by the user. The user may enter the task into a device, such as mobile device 102 or some other device capable of providing the task or information about it to mobile device 102 or remote device 104. This task can be specified by a user through entry of text (e.g., through typing or voice-recognition), selection of a selectable graphic or other user interface control, or in various other data-entry manners.

Consider, for example, a case where a user enters a task of "pick up contact solution" into a task list or calendar on her desktop computer at her office. The task and/or information about the task is then made available to mobile task manager 210 and/or remote task manager 306 (hereinafter referred to as "manager 210/306" for brevity).

The task and information about it may be one in the same or differ. In this case, for example, the information includes the text of the task "pick up contact solution" and also when the task was entered. Other information may include a deadline for completion of the task (if given or having a default deadline), a priority of the task, a proximity threshold (e.g., "two miles"), various default settings, and others.

The task may also indicate an item for purchase (shampoo, dinner, contact solution, etc.), a class of entities at which the task can be performed (pharmacy, grocery store, mall, restaurant, etc.), or a specific entity. Examples of these are described as part of the example methods below.

For this example, manager 210/306 receives or retrieves, from the desktop computer and through network 106, the text of the task "pick up contact solution" and when it was entered.

Block 404 determines, based on the information and a location of a mobile device associated with the user, that an entity at which the task can be performed is proximate the mobile device. Block 404 may receive or determine the location of the mobile device associated with the user, such as through cellular triangulation of a cellular network device, global positioning satellite techniques, or other manners.

Block 404, in some cases, determines entities at which the task can be performed. In the ongoing example, the task includes an item for purchase and block 404 determines one or more classes of entities or a set of specific entities at which that item can be purchased. The example classes of entities include pharmacies, grocery stores, and malls. The set of specific entities include Low-Cost Drug, Quality Food Store, Jim's Quickie-Mart, and the South-Side Mall, for example. Block 404 may determine the set of specific entities based on a user's history or preference, or them being part of the classes of entities and being in a same town or locale as the user, for example.

Furthermore, block 404 may determine or receive from other sources the brands carried by these specific entities, their hours of operation, and current pricing of the item or similar items. The techniques may prioritize or exclude an entity based on this data or provide the data to the user.

Continuing the ongoing example, assume that manager 210/306 determines a location of mobile device 102 (and thus presumably the user) and classes of entities at which the task can be performed, here that task "pick up contact solution" can be performed at pharmacies, grocery stores, and malls. Based on the location of mobile device 102 and the classes of entities, manager 210/306 determines specific entities proximate the user.

A proximity threshold in which entities are determined to be proximate the user can be based on various factors. These factors include: a distance selected by the user for the task; a default distance; an estimated amount of time to drive or walk to the entity from the mobile device's current location; a priority indicated in the information or task; additional tasks that can also be performed at the same entity; a deadline for completion of the task; and/or other factors noted herein.

For the ongoing example manager 210/306 determines a proximity threshold of three miles. Based on this proximity threshold, assume that no specific entities of the classes of entities are determined to be proximate at a first particular time, such as when the user is at her office. When the user begins her drive home, however, block 404 is repeated as some time or change in distance, after which block 404 determines that the pharmacy Low-Cost Drug is proximate (within three miles) of mobile device 102.

Returning to method 400, block 406, responsive to determining that an entity at which the task can be performed is proximate the mobile device, causes the mobile device to notify the user. For this example, manager 210/306 causes user interface 212 to notify the user that Low-Cost Drug is proximate the user.

In addition to indicating that this entity is proximate the user, block 406 can provide information potentially useful to the user, such as a location of the entity, a distance or drive/walk time between the geographic location and the mobile device, a deadline or amount of time still available for completion of the task, or that the task can be performed at some proximate entity. Manager 210/306, for example, may determine, with aid of driving or mapping software, a time and directions for the user to drive to the entity, and provide this along with the notification.

Figure 5:
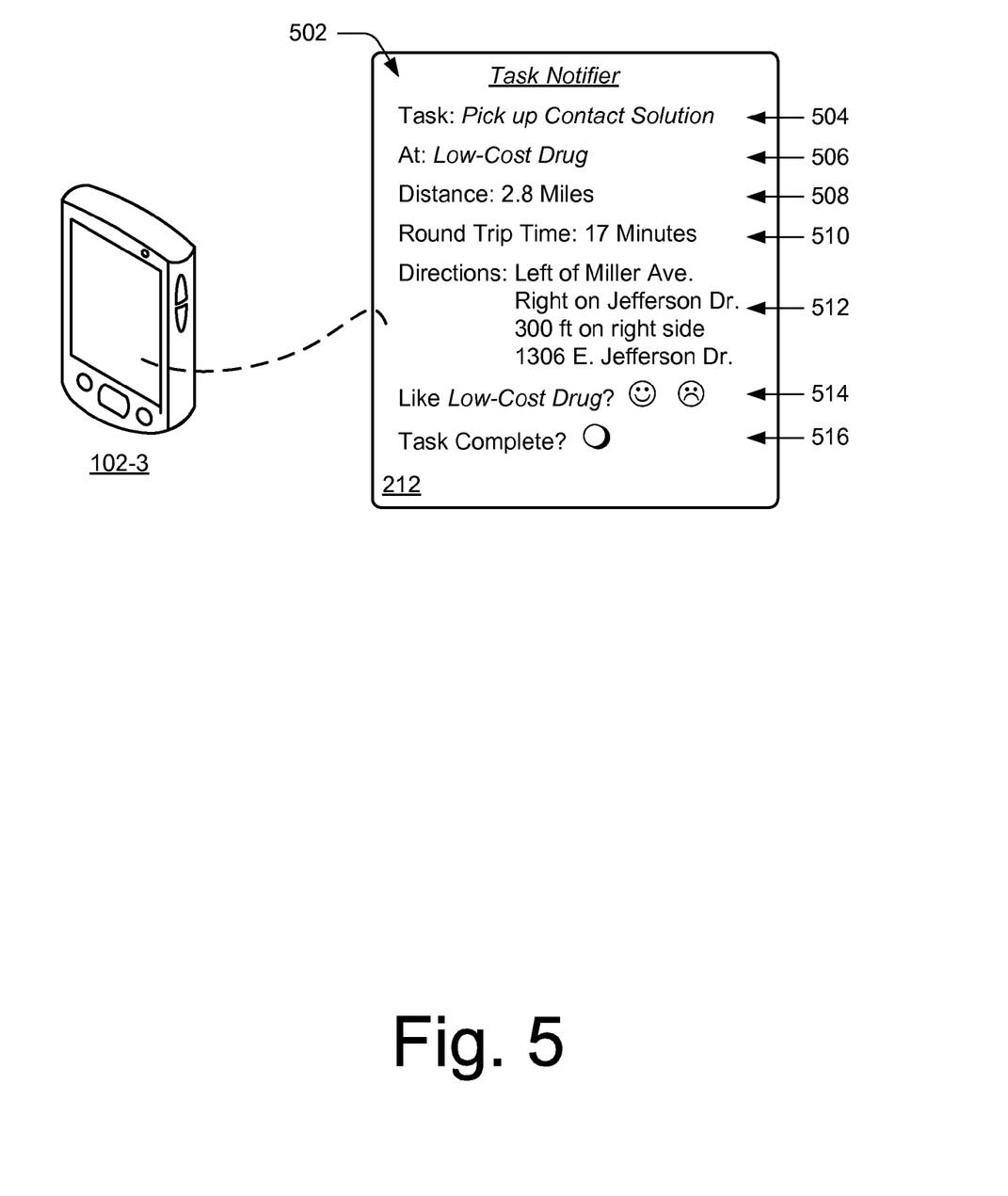
FIG. 5 illustrates a notification, through the user interface of FIG. 2, that an entity is proximate the mobile device of FIG. 1 or 2.

Continuing this example, consider FIG. 5, which illustrates a notification 502 through user interface 212 of smart phone 102-3 caused by manager 210/306. Notification 502 indicates the task "pick up contact solution" at 504, the entity "Low-Cost Drug" at 506, a distance of 2.8 miles at 508, a round-trip driving time of 17 minutes at 510, directions to the entity at 512, a user preference for the entity at 514, and a task completion control at 516.

At this point in the example, the user may choose to drive to the Low-Cost Drug store or continue to drive home. If the user drives home, ignoring the notification, manager 210/306 may repeat parts of method 400 to notify the user again of other entities later in the drive home or again of this entity tomorrow if the user drives near to Low-Cost Drug. Or the user may select a preference at 514 indicating that she does not like this store, in which case manager 210/306 may remove it from further consideration. In such a case manager 210/306 may record this preference as one criteria for later use, such as in criteria 218 of FIG. 2.

The techniques also permit the user to use this or some other interface to alter her preferences for this or other tasks. Thus, she may select to add information to the task so that the task reads: "Pick up Contact Solution at Quality Food Store". Further still, she may alter the proximity threshold because she does not want to run this errand if it requires a drive of more than two miles or 10 minutes round trip. These are but a few of the preferences that user may select and based on which the techniques may provide proximity-based task notifications.

Concluding the ongoing example, assume that the user ignores the notification. Manager 210/306 then repeats blocks 404 after mobile device 102 moves two miles or after an amount of time, and determines, later in the user's drive home, that she is within 1.4 miles of the Quality Food Store. Manager 210/306 notifies her through mobile device 102 of her proximity to the Quality Food Store, after which she drives to this store and completes the task.

As noted above, method 400 can be performed at a mobile device, remote device, or both. Thus, method 400 is described in the context of being performed by mobile task manager 210 or by remote task manager 306 or in combination. If performed by remote task manager 306, for example, a remote entity causes user interface 212 of mobile device 102 to notify the user, such as through a command transmitted through communication network 106. Method 600, however, is performed by a mobile device and described in the context of mobile task manager 210.

FIG. 6 depicts a method 600 for proximity-based task notification generally from the perspective of mobile task manager 210. Ways in which operations are performed in method 600 may also be applied to the techniques generally, and operations of, method 400.

Block 602 receives entry of a task at a mobile computing device. Types and examples of tasks received, and information about the tasks, as well as various criteria are described in detail above.

Figure 7:
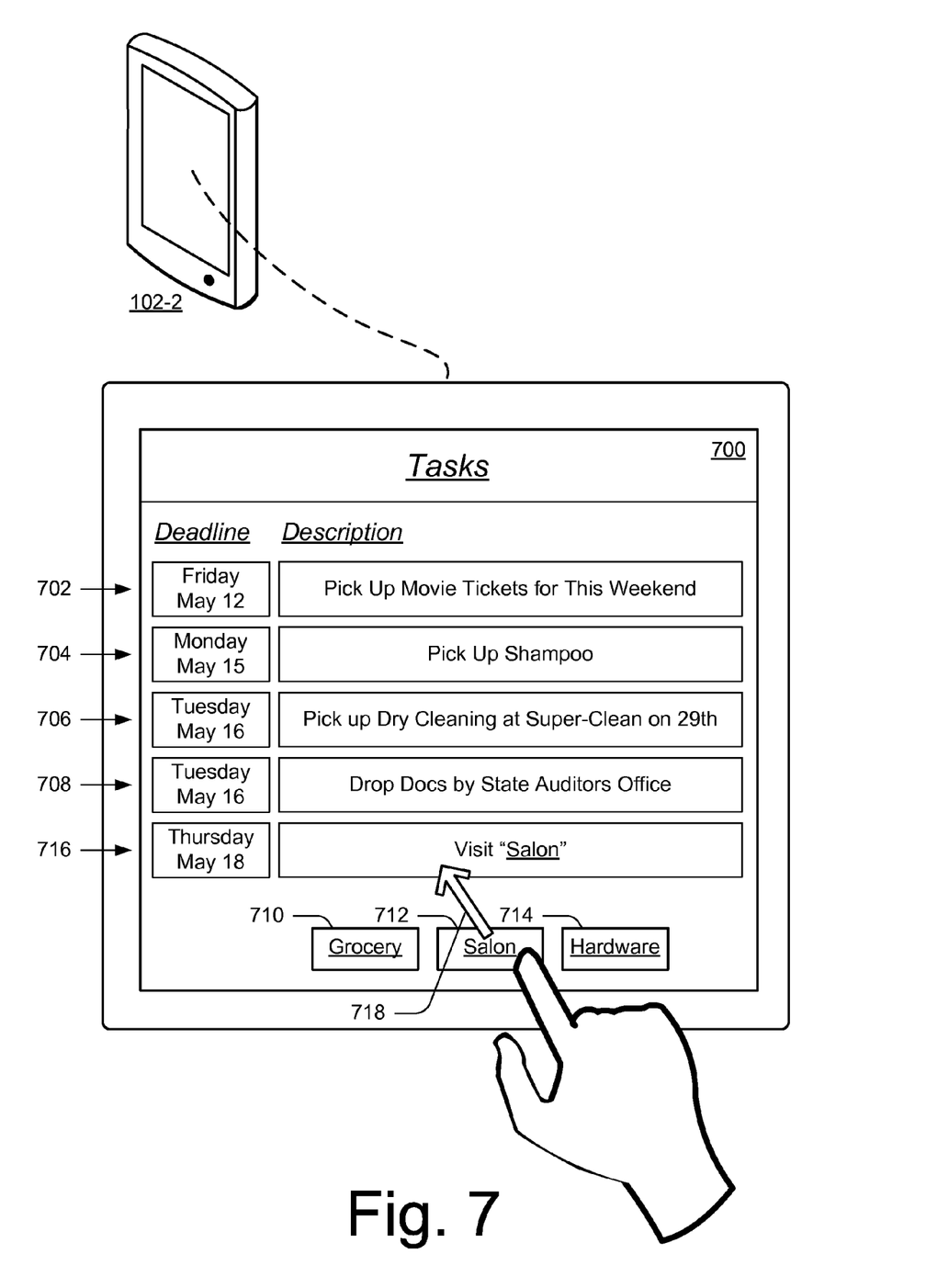
FIG. 7 illustrates a user interface having four previously selected tasks and selection of a fifth task through selection of a selectable graphic.

By way of example, assume that a user enters a task as shown in FIG. 7. Here user interface 700 of tablet computing device 102-2 presents four previously selected tasks having deadlines. Deadlines can be set by default, by where entered (and thus time/date) into an electronic calendar, specifically by the user, or not selected. Here user interface 700 presents prior tasks 702, 704, 706, and 708 including deadlines selected by the user. User interface 700 receives the current task by selection of one of selectable graphics 710, 712, or 714. These selectable graphics represent classes of entities and associated tasks performable at the classes of entities, here grocery stores, hair salons, and hardware stores, respectively. The user selects selectable graphic 712 in response to which mobile task manager 210 generates a task 716 to "visit Salon," which is illustrated with arrow 718. A deadline for task 716 is set by default in this case, though user interface 700 permits the user to alter the deadline. For purposes of this example, assume that the current day is Thursday, May $11^{th}$.

Block 604 determines, based on the task or information associated with the task, a proximity threshold for the task. This information may include any of the examples given herein, such as a deadline, priority, or user-selected proximity threshold, among others, and may be performed similarly to as set forth above in method 400. Note that the proximity threshold for the task can be a geographical proximity or a temporal proximity. If a temporal proximity, a walking or driving time can be computed, such as by mapping software accessible by mobile task manager 210.

Continuing the ongoing example, assume that the task is task 716 to "visit Salon." Information associated with task 716 includes a received date of Thursday, May $11^{th}$, that the task was selected based on a class of entities ("Salons") rather than entered directly, and that a deadline of Thursday, May, $18^{th}$ is set. Based on this task and its associated information, mobile task manager 210 determines that a proximity threshold of two miles is appropriate, though this proximity threshold can be altered.

Block 606 determines, based on the task or information, multiple entities at which the task can be performed, the entities having locations, respectively. Determining the multiple entities may include providing the task or information to a remote entity and receiving, from the remote entity, the multiple entities and the locations for the multiple entities. In some cases a remote entity, such as remote device 104, can more-quickly determine appropriate entities and their locations than mobile device 102, such as when mobile device 102 has limited communication or computational resources.

Here mobile task manager 210 determines that hair salons, barbershops, and spas are appropriate classes (or subclasses) of entities and provides these to a remote device via communication network 106 as search terms for specific entities of a town or community in which mobile device 102 currently or often resides. The remote device communicates these specific entities to mobile task manager 210 along with their respective locations.

Block 608 determines a location of the mobile computing device. This can be performed by location manager 214 of FIG. 2 alone or in combination with a remote entity and/or as described above.

Block 610 determines, based on the locations of the entities and the location of the mobile computing device, that one or more of the entities are within the proximity threshold for the task. Continuing the ongoing example, mobile task manager 210 determines that two entities are within the two-mile proximity threshold for task 716 ("visit Salon"), namely Well-Cut Barber and Sophisticate Spa and Salon.

Block 612 notifies, through the mobile computing device, of the one or more entities within the proximity threshold for the task. Here mobile task manager 210 notifies the user through user interface 212 of tablet computing device 102-2. If the user completes task 716, such as by getting a haircut, buying a gift certificate, or buying shampoo (task 716 did not specify the task in detail), method 600 may complete. In some cases, however, a user does not choose to complete the task or no entities are within the determined proximity threshold within some period of time (e.g., the first couple days of a one-week deadline). In this and other cases method 600 proceeds to block 614 to alter the proximity threshold and, responsive to this alteration or at a later time, repeats one or more blocks of method 600.

Concluding this example, assume that mobile task manager 210 increases the proximity threshold to four miles for task 716 if the user has not visited a salon within five days (two days from the deadline). Method 600 then uses this increased proximity threshold in determining proximate entities and notifying the user.

The techniques may also group multiple tasks or alter their respective proximity thresholds, which can save a user time and energy. In the context of method 600 and the example tasks of FIG. 7, assume that all five tasks illustrated in FIG. 7 have not been completed on Thursday, May 11$^{th}$. Assume also that the proximity thresholds for the five tasks range between two and four miles. At block 614, mobile task manager 210 alters proximity thresholds of task 716 and prior tasks 702, 704, 706, and 708 based on determining an entity or location at which multiple tasks can be performed. Whether grouped for purposes of notification or not, altering proximity thresholds for multiple tasks can be effective to group them in that a user is notified of multiple tasks capable of being performed at one entity or location.

In this example, mobile task manager 210 alters the proximity thresholds to five miles if three tasks can be performed at once, six miles for four tasks, and seven miles for five tasks. Based on this alteration, mobile task manager 210 notifies the user when she is within 6.5 miles of a location having a mall and two nearby entities, the mall including a theater to pick up movie tickets, a pharmacy and salon to pick up shampoo to perform task 704, a salon to visit per task 716, and two nearby entities, the dry-cleaning store noted in task 706 (adjacent the mall) and one of the State Auditor's Offices (across the street from the mall) to drop documents by per task 708.

The preceding discussion describes methods relating to proximity-based task notification. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in environment 100 of FIG. 1 including as detailed in FIG. 2 or 3, and/or example device 800 described below, which may be further divided, combined, and so on. Thus, environment 100 and/or device 800 illustrate some of many possible systems or apparatuses capable of employing the described techniques. The entities of environment 100 and/or device 800 generally represent software, firmware, hardware, whole devices or networks, or a combination thereof. In the case of a software implementation, for instance, the entities (e.g., mobile task manager 210 and remote task manager 306) represent program code that performs specified tasks when executed on a processor (e.g., processor(s) 202 and/or 302). The program code can be stored in one or more computer-readable memory devices, such as media 302 and/or 304 or computer-readable media 814 of FIG. 8.

Example Device

Figure 8:
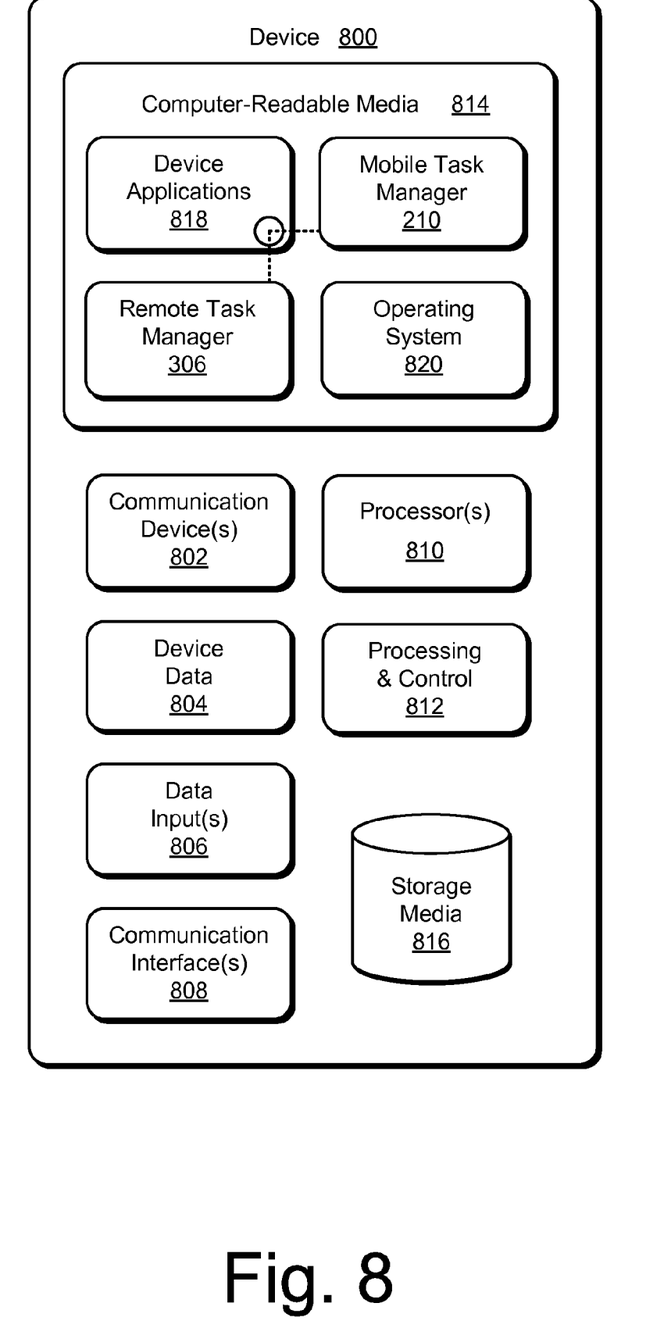
FIG. 8 illustrates an example device in which techniques for proximity-based task notification can be implemented.

FIG. 8 illustrates various components of example device 800 that can be implemented as any type of client, server, and/or computing device as described with reference to the previous FIGS. 1-7 to implement techniques for proximity-based task notification. In embodiments, device 800 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 800 may also be associated with a user (e.g., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as human utterances, user-selectable inputs, messages, music, television media content, recorded video content, and any other type of audio, video, and/or image data received from any content and/or data source.

Device 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like), which process various computer-executable instructions to control the operation of device 800 and to enable techniques for proximity-based task notification. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 may include a device manager, such as any form of a control application, software application, signal-processing and control module, code that is native to a particular device, a hardware abstraction layer for a particular device, and so on.

The device applications 818 also include any system components, engines, or modules to implement techniques for proximity-based task notification. In this example, the device applications 818 can include mobile task manager 210 or remote task manager 306.

CONCLUSION

Although embodiments of techniques and apparatuses proximity-based task notification have been described in language specific to features and/or methods, it is to be understood that the subject of the appended claims is not necessarily limited to the specific features or methods described. Rather, the specific features and methods are disclosed as example implementations for proximity-based task notification.

What is claimed is:

1. A computer-implemented method comprising:
   receiving information associated with a task specified by a user, the information associated with the task including a priority of the task and a deadline for completion of the task;
   determining, based on the priority of the task and the deadline for completion of the task, a geographical or temporal distance over which a search is performed to determine proximity with entities at which the task can be performed;
   increasing, responsive to a decrease in an amount of time until the deadline for completion of the task is encountered, a size of the geographical or temporal distance over which the search is performed to determine proximity with the entities at which the tack can be performed;
   determining, based on the increased geographical or temporal distance and a location of a mobile device associated with the user, that one of the entities at which the task can be performed is within the increased geographical or temporal distance; and
   responsive to determining that the entity at which the task can be performed is within the increased geographical or temporal distance, causing the mobile device to notify the user of a location of the entity, a distance between the location of the entity and the location of the mobile device, and that the entity is proximate the user.

2. A computer-implemented method as described in claim 1, wherein the information includes a selection of, or text entered by, the user.

3. A computer-implemented method as described in claim 2, wherein the selection or the text indicates an item for purchase.

4. A computer-implemented method as described in claim 1, wherein the method is performed by the mobile device associated with the user.

5. A computer-implemented method as described in claim 1, wherein receiving the information, determining that the entity is within the increased geographical or temporal distance, and causing the mobile device to notify are performed by a device remote from the mobile device associated with the user, and wherein causing the mobile device to notify the user includes transmitting a command to the mobile device over a mobile communications network.

6. A computer-implemented method as described in claim 1, further comprising determining the entities at which the task can be performed.

7. A computer-implemented method as described in claim 6, wherein determining the entities at which the task can be performed determines one or more classes of entities at which an item associated with the task can be purchased, the entity being included within at least one of the one or more classes.

8. A computer-implemented method as described in claim 1, wherein the information indicates a class of entities associated with the task and determining that an entity at which the task can be performed is within the increased geographical or temporal distance determines a specific entity included within the class of entities that are within the increased geographical or temporal distance.

9. A computer-implemented method as described in claim 1, wherein determining the geographical or temporal distance is further based on an estimated amount of time to drive or walk from the location of the mobile device to the location of the entity.

10. A computer-implemented method as described in claim 1, wherein determining that the entity is within the geographical or temporal distance is based on hours of operation of the entity or causing the mobile device to notify the user is based on the hours of operation of the entity.

11. A computer-implemented method as described in claim 1, wherein causing the mobile device to notify the user causes the mobile device to notify the user of an association of the task to the entity at which the task can be performed.

12. A computer-implemented method as described in claim 1, wherein causing the mobile device to notify the user causes the mobile device to notify the user of an estimated travel time to the entity or another estimated travel time for the user to go to and return from the entity.

13. A computer-implemented method as described in claim 1, wherein determining the increased geographical or temporal distance is further based a location of an additional entity near the entity at which one or more additional tasks can be performed.

14. A computer-implemented method as described in claim 13, further comprising determining the increased geographical or temporal distance based on a deadline for completion of the one or more additional tasks that can also be performed at the entity or at the additional entity near the entity.

15. A computer-implemented method as described in claim 14, wherein determining the increased geographical or temporal distance includes further increasing the geographical or temporal distance based on a number of additional tasks that can also be performed at the entity or at the additional entity near the entity.

16. A computer-implemented method as described in claim 15, wherein further increasing the increased geographical or temporal distance based on the one or more additional tasks is effective to group the task with the one or more additional tasks as a set of multiple tasks.

17. A computer-implemented method as described in claim 16, further comprising notifying the user of the multiple tasks that are capable of being performed at the entity or at the additional entity near the entity.

18. A computer-implemented method as described in claim 1, wherein determining the geographical or temporal distance is further based on a drive distance from the location of the mobile device to the location of the entity.

19. A computing device comprising:
one or more computer processors; and
one or more computer-readable storage media having instructions stored thereon that, responsive to execution by the one or more computer processors, performs operations comprising:
receiving information associated with a task specified by a user, the information associated with the task including a priority of the task and a deadline for completion of the task;
determining, based on the priority of the task and the deadline for completion of the task, a geographical or temporal distance over which a search is performed to determine proximity with entities at which the task can be performed;
increasing, responsive to a decrease in an amount of time until the deadline for completion of the task is encountered, a size of the geographical or temporal distance over which the search is performed to determine proximity with the entities at which the tack can be performed;
determining, based on the increased geographical or temporal distance and a location of a mobile device associated with the user, that one of the entities at which the task can be performed is within the increased geographical or temporal distance; and
responsive to determining that the entity at which the task can be performed is within the increased geographical or temporal distance, causing the mobile device to notify the user of a location of the entity, a distance between the location of the entity and the location of the mobile device, and that the entity is proximate the user.

20. A computing device as recited in claim 19, wherein the geographical or temporal distance and the increased geographic or temporal distance are geographic.

* * * * *